(12) United States Patent
Mitani

(10) Patent No.: US 8,456,689 B2
(45) Date of Patent: Jun. 4, 2013

(54) PRINTING METHOD, MULTI-FUNCTION PRINTING APPARATUS, AND PRINTING SYSTEM FOR DISK MEDIA

(75) Inventor: Yasutaka Mitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1203 days.

(21) Appl. No.: 11/559,174

(22) Filed: Nov. 13, 2006

(65) Prior Publication Data

US 2007/0109601 A1 May 17, 2007

(30) Foreign Application Priority Data

Nov. 16, 2005 (JP) ................................ 2005-332057

(51) Int. Cl.
*G06K 15/00* (2006.01)
*H04N 1/40* (2006.01)
*H04N 1/46* (2006.01)

(52) U.S. Cl.
USPC ............................ 358/1.18; 358/462; 358/538

(58) Field of Classification Search
USPC ................ 358/1.18, 1.15, 538, 462; 369/116, 369/3.24; 347/2, 4
See application file for complete search history.

(56) References Cited

U.S. PATENT DOCUMENTS

| 6,264,295 | B1 * | 7/2001 | Bradshaw et al. ................ 347/2 |
| 6,801,487 | B2 * | 10/2004 | Anderson ................... 369/47.12 |
| 6,871,946 | B2 | 3/2005 | Yanagi et al. | |
| 7,483,184 | B2 * | 1/2009 | Koll et al. ..................... 358/486 |
| 7,621,615 | B2 | 11/2009 | Kikuchi et al. | |
| 2003/0117932 | A1 * | 6/2003 | Morishima et al. ........... 369/116 |
| 2004/0051917 | A1 * | 3/2004 | Kawazoe et al. ............. 358/498 |
| 2005/0179914 | A1 * | 8/2005 | Fuse .............................. 358/1.2 |

FOREIGN PATENT DOCUMENTS

| JP | 8-255459 A | 10/1996 |
| JP | 2003-001873 | 1/2003 |
| JP | 2003-266855 A | 9/2003 |
| JP | 2004-042372 | 2/2004 |
| JP | 2004-122583 | 4/2004 |
| JP | 2004-358714 A | 12/2004 |
| JP | 2005-276313 A | 10/2005 |
| JP | 2005-288773 A | 10/2005 |
| JP | 2005-315856 A | 11/2005 |

OTHER PUBLICATIONS

Japanese Office Action dated Mar. 9, 2010, issued in corresponding Japanese patent application No. 2005-332057.
Japanese Office Action dated Jul. 20, 2010, issued in counterpart Japanese patent application No. 2005-332057.

* cited by examiner

*Primary Examiner* — Benny Q Tieu
*Assistant Examiner* — Sunil Chacko
(74) *Attorney, Agent, or Firm* — Fitzpatrick, Cella, Harper & Scinto

(57) ABSTRACT

A print control method performed by a print control apparatus. The method includes acquiring data indicating a state of a surface of a disk medium obtained by optically reading the surface of the disk medium, determining a printable area for printing an image on the disk medium based on the acquired data, generating print data based on image data stored in a memory for printing on the determined printable area on the disk medium, and causing a printing apparatus to print an image represented by the image data stored in the memory on the determined printable area on the disk medium, based on the generated print data.

7 Claims, 15 Drawing Sheets

F I G. 1
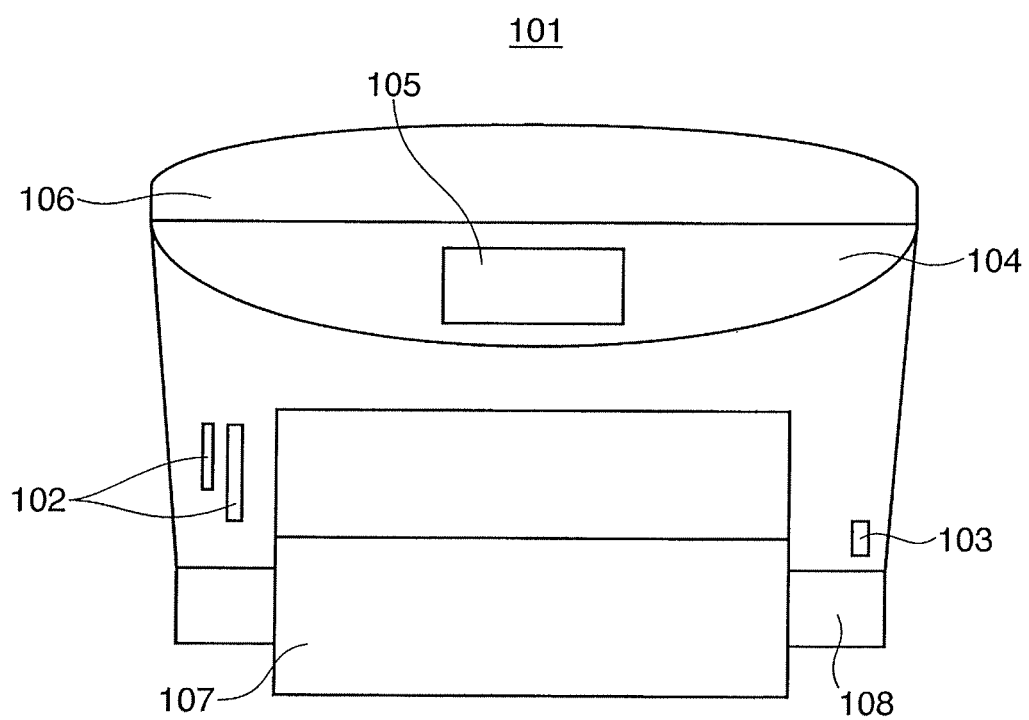

F I G. 14A
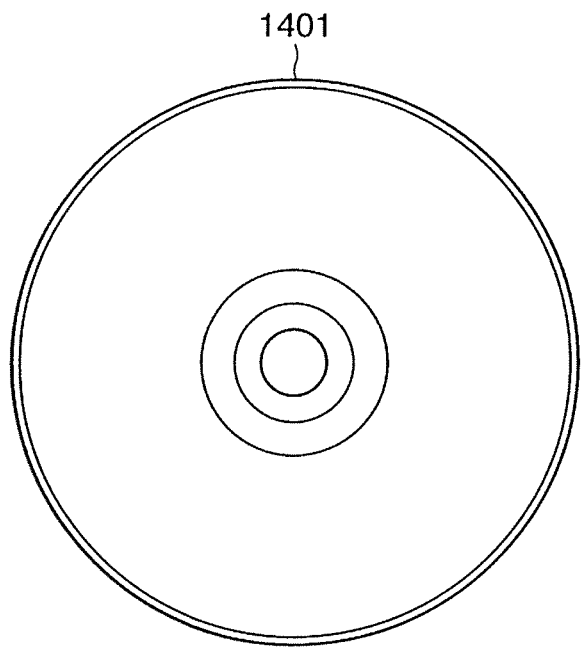
F I G. 14B
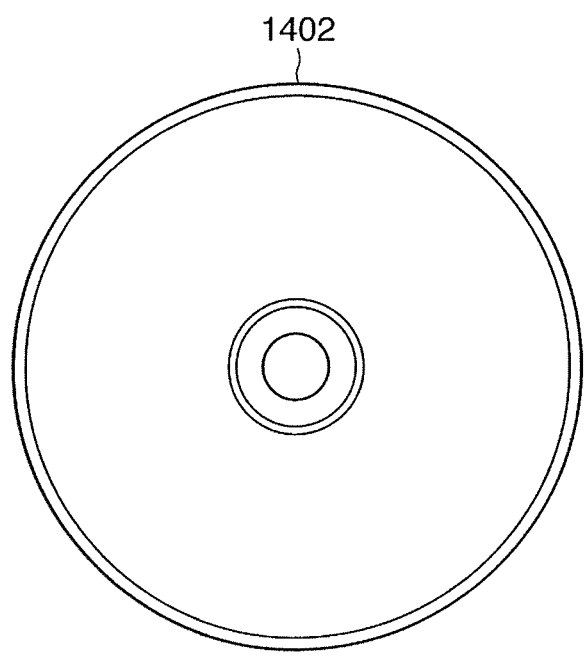

PRINTING METHOD, MULTI-FUNCTION PRINTING APPARATUS, AND PRINTING SYSTEM FOR DISK MEDIA

This application claims the benefit of Japanese Patent Application No. 2005-332057, filed Nov. 16, 2005, which is hereby incorporated by reference herein in its entirety.

BACKGROUND OF THE INVENTION

1. Field of the Invention

The present invention relates to a printing method, a printing apparatus, and a printing system. Particularly, the present invention relates to a printing method, a multi-function printing apparatus, and a printing system applied to printing on disk media in a multifunctional peripheral, such as a multi-function printer, in which a printer function, a copying function, and the like, are integrated.

2. Description of the Related Art

At present, a multi-function printer has been proposed, which is built by structurally integrating a flatbed scanner, a memory card reader, an external connection terminal, and a printer unit for discharging small ink droplets, to execute printing with high quality, on the order of that of a photograph. For example, the multi-function printer can copy and print a photo image in a memory card, without connecting the printer to a personal computer, or the like. The multi-function printer is also called an MFP, and various models are commercially available. To the contrary, a printer having a function of only printing image data input from an external device on a medium is also called a single-function printer (SFP).

Currently available SFPs and MFPs can print an image on a disk medium, such as a CD or a DVD, by using a special tray. The MFP can use a scanner unit to scan an image of a disk medium, and can use the special tray and printer section to copy labels between disk media. A commercially viable SFP, flatbed scanner, and personal computer are also available to copy the labels between disk media.

The disk medium will be explained.

FIGS. 14A and 14B re plan views of two types of inkjet printing disk media.

A conventional inkjet printing disk medium 1401 generally has a white label with a regular-size printable area, as shown in FIG. 14A. These days, various disk media have come onto the market, including a disk medium having a glossy surface, a colored disk medium, and a disk medium having a wider printable area (label), such as a disk medium 1402 shown in FIG. 14B.

The disk medium is circular, unlike a print medium, such as a normal print sheet, so the printable area (label) of a disk medium must be detected in printing. As a conventional method of detecting the printable area (label) of a disk medium, a carriage to which a printhead is mounted with a reflection optical sensor, and a special tray, are used. According to this method, the reflection optical sensor reads a plurality of highly reflective sheets adhered to the special tray, to locate the position of a disk medium and to execute printing.

In other words, the medium position is determined by reading the positions of reflection sheets, on the basis of the fact that the media mounting portion on the tray is determined in advance, instead of reading the disk medium itself For example, Japanese Patent Publication Laid-Open No. 2004-42372 discloses the above conventional art.

However, the conventional art does not directly detect the printable area (label) of a disk medium. Also, the conventional art cannot detect a difference in printable area or glossiness, and cannot accurately detect a printable area (label) having a different glossiness. Thus, the conventional art cannot cope with various types of disk media on the market. It is, therefore, desirable to process scanned image data into the medium shape and to print, so that wasteful ink consumption can be reduced. This process also can solve a problem of printing outside the printable area.

SUMMARY OF THE INVENTION

Accordingly, the present invention is conceived as a response to the disadvantages of the conventional art, which have been discussed above.

For example, a printing method, a multi-function printing apparatus, and a printing system according to this invention are capable of coping with various types of disk media, printing on media, and copying between disk media.

According to one aspect, the present invention, preferably provides a printing method capable of copying an image printed on a surface of a first disk medium onto a surface of a second disk medium. The method includes a first scanning step of optically scanning the image printed on the surface of the first disk medium, and storing image data representing the image in a memory, a second scanning step of optically scanning a state of the surface of the second disk medium and acquiring data on the state of the surface, a location step of locating a printable area of the second disk medium by analyzing the data acquired in the second scanning step, and a printing step of copying the image in the printable area located in the location step, on the basis of the image data stored in the memory.

The method desirably further comprises a determination step of determining the type of the second disk medium from glossiness of the surface of the second disk medium, by analyzing the data acquired in the second scanning step, and a control step of controlling printing in the printing step, in accordance with a determination result in the determination step.

According to another aspect, the present invention provides a multi-function printing apparatus capable of copying an image printed on a surface of a first disk medium onto a surface of a second disk medium. The apparatus includes first scanning means for optically scanning the image printed on the surface of the first disk medium, storage means for storing image data representing the image scanned by the first scanning means, second scanning means for optically scanning a state of the surface of the second disk medium, location means for locating a printable area of the second disk medium by analyzing data on the state of the surface scanned by the second scanning means and printing means for copying the image in the printable area located by the location means, on the basis of the image data stored in the storage means.

The apparatus desirably further comprises determination means for determining the type of the second disk medium from glossiness of the surface of the second disk medium, by analyzing the data acquired by the second scanning means, and printing control means for controlling printing by the printing means, in accordance with a determination result of the determination means.

The printing means desirably includes an inkjet printhead, a carriage which supports the inkjet printhead and reciprocates in a first direction, a tray detachable from the apparatus, in which the second disk medium is set, and conveyance means for conveying the tray and a medium to be printed, in a second direction perpendicular to the first direction.

As one aspect, the first scanning means and the second scanning means can be implemented by flatbed scanners.

In this case, the location means desirably generates a density distribution with respect to a radial direction of the second disk medium, on the basis of the data on the state of the surface of the second disk medium optically scanned by the flatbed manner, and locates the printable area on the basis of the density distribution.

As another aspect, it is also possible to implement the first scanning means by a flatbed scanner and the second scanning means by a reflection optical sensor attached to the carriage, and to arrange a sheet representing a predetermined color at the center of the tray.

In this case, the apparatus preferably further comprises movement control means for controlling operation to move the carriage and the tray, which supports the second disk medium, and is loaded into the apparatus, so as to allow the carriage to scan the second disk medium along the center line of the second disk medium, and the location means preferably generates a density distribution along the center line of the second disk medium, on the basis of the data on the state of the surface of the second disk medium obtained by the reflection optical sensor, by scanning of the carriage along the center line under control of the movement control means, and locates an edge of the second disk medium and the printable area on the basis of the density distribution.

The determination means preferably compares a density corresponding to the printable area with a density corresponding to a sheet, and determines the type of the second disk medium in accordance with a comparison result.

At this time, the printing control means preferably controls operation to change the number of passes in multipass control of the inkjet printhead and an ink discharge amount from the inkjet printhead, in accordance with a determination result.

The first disk medium and the second disk medium include a CD and a DVD.

According to still another aspect, the present invention preferably provides a printing system including an image scanning apparatus which optically scans an image printed on a surface of a disk medium, a printing apparatus capable of printing an image on a surface of a disk medium, and a host apparatus which controls the image scanning apparatus and the printing apparatus, receives image data generated by image scanning of the image scanning apparatus, performs image processing, and transmits an image to the printing apparatus, wherein the image scanning apparatus comprises scanning means for optically scanning an image printed on a surface of a first disk medium and a state of a surface of a second disk medium, and transmission means for transmitting, to the host apparatus, image data representing the image scanned by the scanning means and data representing the state of the surface, the host apparatus comprising reception means for receiving the data on the state of the surface transmitted from the image scanning apparatus, location means for locating a printable area of the second disk medium by analyzing the data on the state of the surface received by the reception means, and transmission means for transmitting, to the printing apparatus, the image data and information on the printable area located by the location means, and the printing apparatus comprises printing means for copying the image on the second disk medium on the basis of the image data and the information on the printable area transmitted from the host apparatus.

According to still another aspect, the present invention preferably provides a printing method capable of copying an image printed on a surface of a first disk medium onto a surface of a second disk medium. The method includes a scanning step of optically scanning the image printed on the surface of the first disk medium and a state of the surface of the second disk medium at the same time, a determination step of determining, out of image data based on the image printed on the surface of the first disk medium and data based on the state of the surface of the second disk medium, which are scanned and generated in the scanning step, which data is from a copy source medium and which data is from a copy destination medium, a storage step of storing, into a memory, the image data based on the image printed on the surface of the first disk medium, which is determined to be the copy source medium, on the basis of a determination result in the determination step, a location step of locating a printable area of the second disk medium, which is determined to be the copy destination medium, on the basis of the determination result in the determination step, and a printing step of editing the image data stored in the memory in accordance with a size of the printable area located in the location step, and copying the image on the basis of the edited image data.

The invention is particularly advantageous, since, even if the printable areas of a copy source disk medium and a copy destination disk medium are different, the printable areas can be accurately located to copy the image of the copy source to the copy destination.

It is possible to determine the type of copy destination disk medium from the glossiness of its surface, and to control printing in accordance with the determination result. As a result, the present invention can achieve copying that is appropriate for the glossiness of the copy destination disk medium.

Further features of the present invention will become apparent from the following description of exemplary embodiments (with reference to the attached drawings).

BRIEF DESCRIPTION OF THE DRAWINGS

FIG. 1 is a front view showing a multi-function printer having a printer section having an inkjet printhead and a scanner section for optically scanning an image as a typical embodiment of the present invention;

FIGS. 14A and 14B are plan views showing the structures of two types of disk media.

DESCRIPTION OF THE EMBODIMENTS

Figure 2:
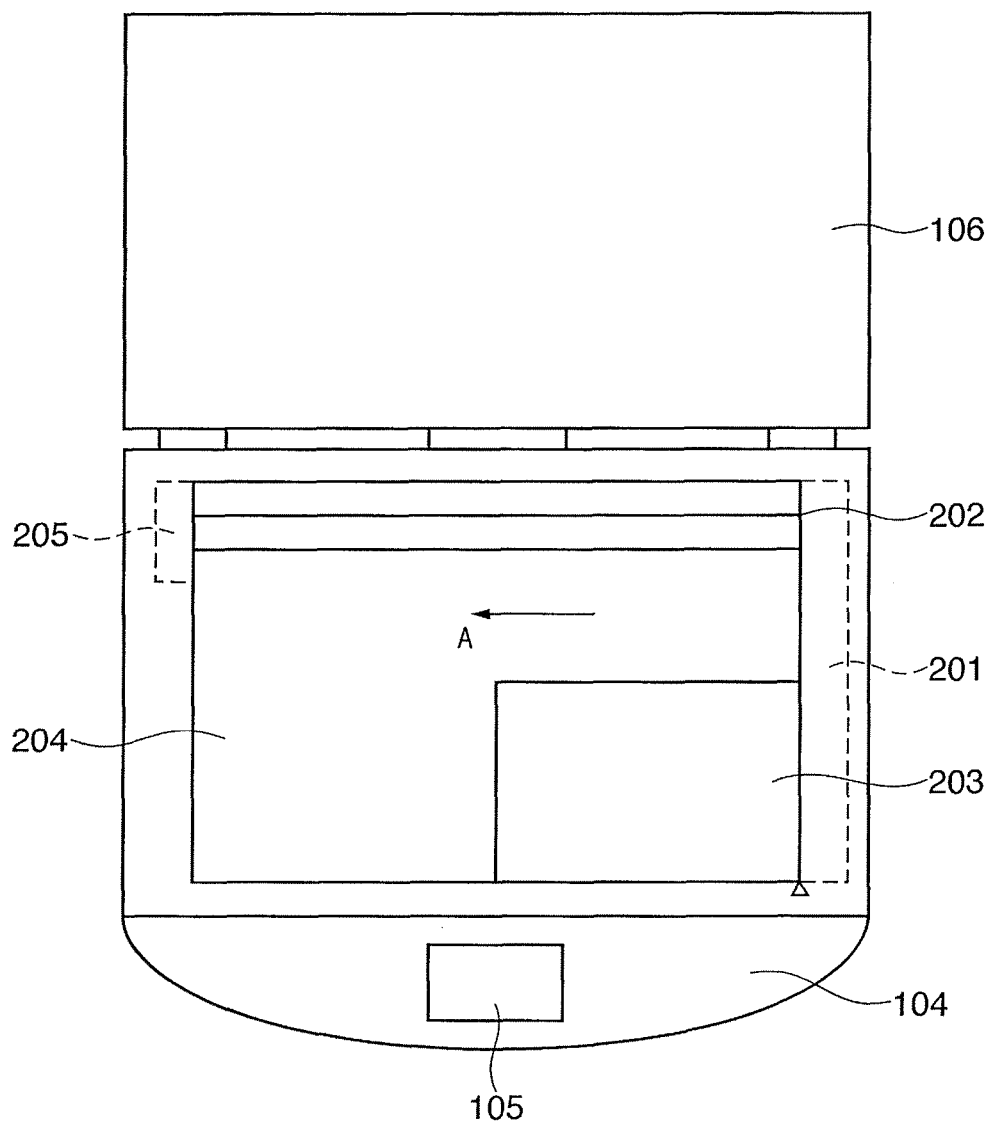
FIG. 2 is a plan view showing the structure of the scanner section of the multi-function printer shown in FIG. 1.

Preferred embodiments of the present invention will now be described in detail in accordance with the accompanying drawings.

In this specification, the terms "print" and "printing" include not only the formation of significant information, such as characters and graphics, but also, broadly includes the formation of images, figures, patterns, and the like, on a print medium, or the processing of the medium, regardless of whether they are significant or insignificant, and whether they are visualized so as to be visually perceivable by humans.

Also, the term "print medium" includes not only a paper sheet used in common printing apparatuses, but also, broadly includes materials, such as cloth, a plastic film, a metal plate, glass, ceramics, wood, and leather, which are capable of accepting ink.

Furthermore, the term "ink" (also to be referred to as a "liquid" hereafter) should be extensively interpreted similarly to the definition of "print" and "printing" described above. That is, "ink" includes a liquid which, when applied onto a print medium, can form images, figures, patterns, and the like, can process the print medium, and can process ink (e.g., can solidify or insolubilize a coloring agent contained in ink applied to the print medium).

Furthermore, unless otherwise stated, the term "nozzle" generally means a set of discharge orifices, a liquid channel connected to an orifice and an element to generate energy utilized for ink discharge.

<Basic Arrangement of Multi-Function Printing Apparatus (FIGS. 1 to 4)>

FIG. 1 is a front view of the outer appearance of a multi-function printer 101 (to be referred to as an MFP hereafter), as a typical embodiment of the present invention. The MFP 101 mainly comprises a printer section and a scanner section. The printer section incorporates a serial inkjet printer, whereas the scanner section incorporates a CCD flatbed scanner. The scanner section is structurally set on the printer section. The scanner section comprises a top lid 106 for pressing an image document. The top lid 106 is pivotal about a hinge (not shown). The printer section comprises a discharge portion 107, which discharges a printed medium outside the apparatus, and a sheet feed portion 108, which supports print media, such as print sheets used for printing.

A memory card slot 102 for inputting/outputting information to/from a memory card used by a digital camera, or the like, is formed on the left side on the front of the MFP 101. There are many types of memory cards, so the MFP 101 has two memory card slots 102, in order to accept these memory cards. An external device connection terminal 103 for connecting an external storage device, such as a digital camera, a DVD/CD-ROM driver, and a removal HDD is provided on the right side on the front of the MFP 101. The external device connection terminal 103 is a USB terminal.

An operation unit 104 having a plurality of operation buttons for operating the MFP 101 is arranged on the top on the front of the apparatus. A color LCD 105 for displaying a menu and an image is arranged at the center of the operation unit 104.

As described above, the MFP 101 comprises the memory card slots 102 and an external device connection terminal 103, in addition to the printer section and the scanner section. The MFP 101 can copy, and print an image in a memory card without connecting the MFP 101 to a host apparatus, such as a personal computer (PC). The color LCD 105 can preview an image scanned by the scanner section and an image in the memory card.

The scanner section of the MFP 101 will now be described.

FIG. 2 is a plan view of the MFP 101.

As shown in FIG. 2, the structure of the scanner section can be viewed by opening the top lid 106. The scanner section mainly comprises a scanner carriage 201, a shaft 202, a glass table 204 for supporting a document 203, and a scanner carriage motor 205 for moving the scanner carriage 201. The scanner carriage 201 supports a scanner unit made up of a light source, a mirror, a lens, a CCD, and the like. The scanner carriage 201 moves along the shaft 202 in a direction indicated by an arrow A, and optically scans the image of the document 203.

When scanning the image of the document 203, a user opens the top lid 106 of the MFP 101 and places the document 203 to be scanned on the glass table 204. Then, the user closes the top lid 106, and operates the operation unit 104 to instruct the MFP to scan the document 203.

Figure 3:
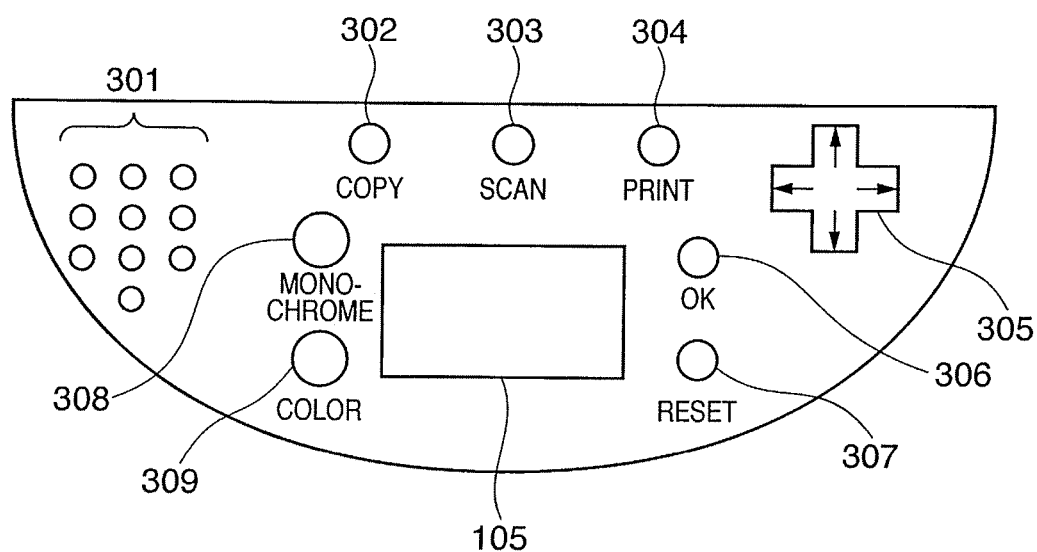
FIG. 3 is a view showing the layout of the operation unit of the multi-function printer shown in FIG. 1.

FIG. 3 is a view of the layout of the operation unit 104.

When scanning a document, a user presses a scan button 303. Upon pressing of the scan button 303, the light source in the scanner carrier 201 is turned on, and the scanner carriage 201 moves along the shaft 202 in the direction indicated by the arrow A. The light source (not shown) irradiates the document 203. The CCD reads the quantity of light reflected by the document 203 via the mirror and lens in the scanner carriage, and converts the light into an electrical signal, which is saved as image data in the memory.

As shown in FIG. 3, the operation unit 104 has various buttons and keys. These buttons and keys are, for example, a ten-key pad 301, a copy button 302, the scan button 303, a print button 304, and a cursor key 305. The operation unit 104 also comprises an OK button 306 for finalizing an input instruction, a reset button 307 for resetting an input instruction, a monochrome process instruction button 308, and a color process instruction button 309. In addition to them, the operation unit 104 comprises switches (not shown) for setting power-on, and online/offline with the host apparatus. The color LCD 105 displays the operation status, images saved in a RAM 513 and memory card 515, a menu, and the like.

The printer section of the MFP 101 will be described.

Figure 4:
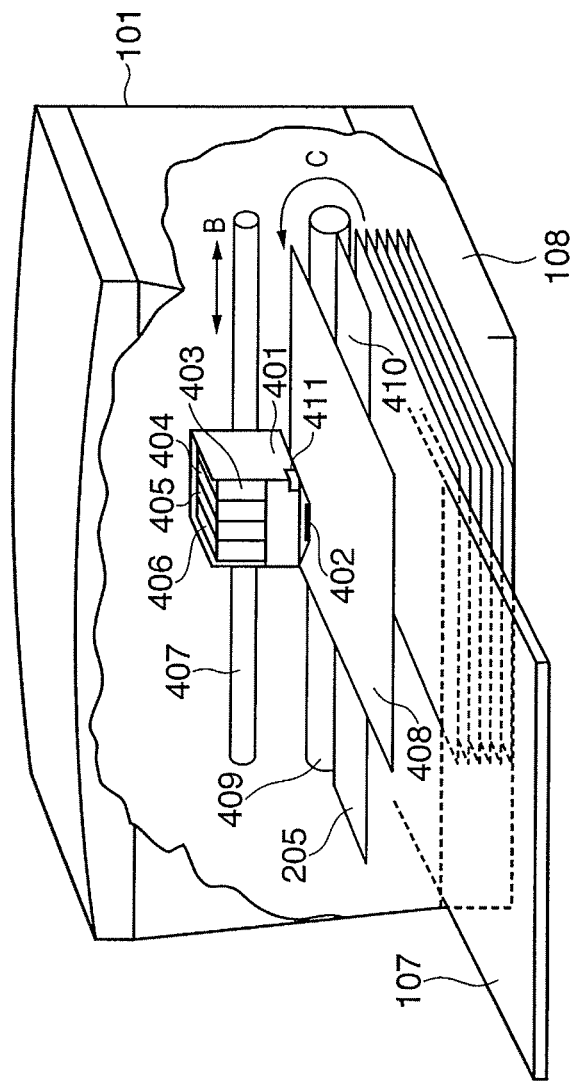
FIG. 4 is a perspective view showing the structure of the printer section of the multi-function printer shown in FIG. 1.

FIG. 4 is a perspective view showing the schematic structure of the printer section of the MFP 101.

As shown in FIG. 4, the printer section mainly comprises a head carriage 401, a printhead 402, ink tanks 403 to 406, a shaft 407, a conveyance roller 409, a platen 410, a head carriage motor (not shown), and a conveyance motor (not shown).

The head carriage 401 supports the printhead 402, the ink tank 403 storing black ink, the ink tank 404 storing cyan ink, the ink tank 405 storing magenta ink, and the ink tank 406 storing yellow ink. While moving in a direction indicated by an arrow B along the shaft 407 supporting the head carriage 401, the head carriage 401 prints by discharging ink droplets onto a print sheet 408.

The head carriage 401 comprises a reflection optical sensor 411 used to detect a CD (to be described later).

In printing, the conveyance roller 409 and driving motor feed the top print sheet 408 at the sheet feed portion 108 by curving it into a U shape, as indicated by an arrow C. As soon as the leading edge of the print sheet 408 reaches under the printhead 402, the head carriage 401 reciprocates in the direction indicated by the arrow B. The printhead 402 discharges ink droplets onto the print sheet 408 to print by one scanning. The conveyance roller 409 conveys the print sheet 408 by a length corresponding to one scanning, and the head carriage 401 scans and prints again. This operation is repeated until printing ends. After that, the print sheet 408 is discharged onto the discharge portion 107, completing the printing operation.

Especially when copying an image printed on a print sheet, a user places the document 203 on the glass table 204, as shown in FIG. 2. The user closes the top lid 106 and presses the copy button 302 of the operation unit 104 shown in FIG.

3. The memory saves image data in accordance with this instruction, similar to the above-mentioned image scanning operation. The temporarily saved image data is converted into print data, and the printer section prints and outputs a copy image.

<Basic Arrangement of Multi-Function Printing Apparatus (FIG. 5)>

Figure 5:
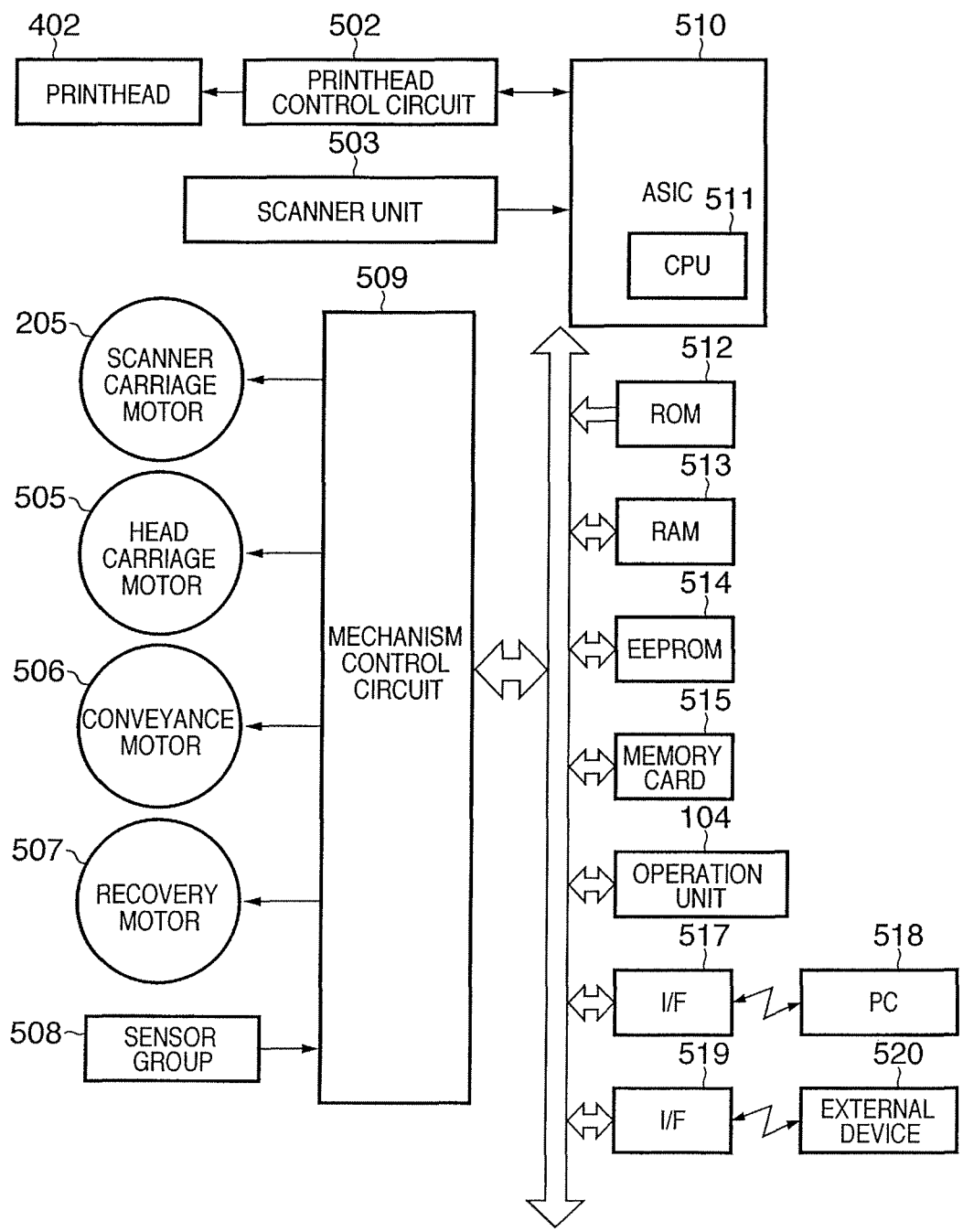
FIG. 5 is a block diagram showing the control arrangement of the multi-function printer shown in FIG. 1.

FIG. 5 is a block diagram showing the control arrangement of the MFP 101 shown in FIG. 1. In FIG. 5, the same reference numerals as those described above denote the same elements, and a description thereof will be omitted.

In FIG. 5, reference numeral 502 denotes a printhead control circuit, which electrically controls the printhead 402 and generates a driving pulse for discharging ink on the basis of image data. Reference numeral 503 denotes a scanner unit, which optically scans an image, reference numeral 505, a head carriage motor which moves the carriage 401, and reference numeral 506, a conveyance motor which conveys a print medium. Reference numeral 507 denotes a recovery motor, which drives a pump for canceling clogging in the nozzle of the printhead 402. Reference numeral 508 denotes a sensor group, which monitors the operation statuses of the printer section and scanner section, and reference numeral 509, a mechanism control circuit which controls and manages various motors and sensors.

Reference numeral 510 denotes an ASIC, including a CPU 511, which entirely controls the operations of respective units in accordance with process procedures to be described later, and reference numeral 512, a ROM which stores programs corresponding to the process procedures executed by the ASIC 510. Reference numeral 513 denotes a RAM which temporarily saves parameters and image data for executing the process procedures by the ASIC 510, reference numeral 514, an EEPROM which saves the status of the printhead 402 even after turning off the apparatus, and reference numeral 515, a memory card which mainly saves image data in a digital camera, or the like.

Reference numerals 517 and 519 denote interfaces (I/Fs) with external devices. A personal computer (PC) 518 connects the MFP 101 via the interface 517 by a cable, whereas an external device 520, such as a digital camera or an optical disk, connects to it via the interface 519 by cable. The MFP 101 and the external devices input/output image data to/from each other via the interfaces 517 and 519.

[Copying of a CD Label]

Copying using the MFP 101 with the above arrangement will be explained.

Figure 6:
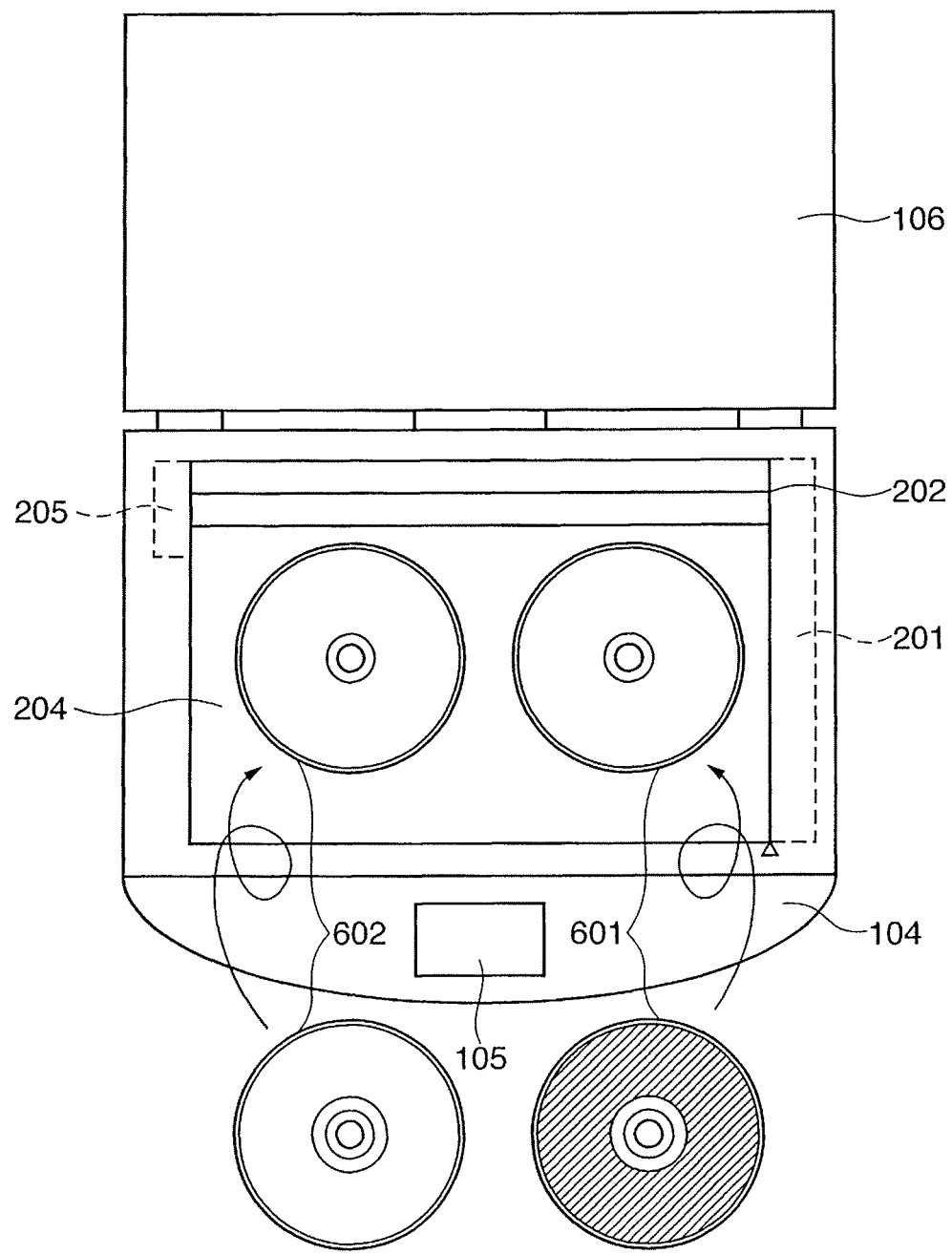
FIG. 6 is a view for explaining CD label copying.

FIG. 6 is a plan view of the MFP 101 showing a state in which a copy source CD and copy destination CD are placed on the glass table 204.

When copying a CD label, a copy source CD 601, on which an image has been printed and a copy destination CD 602, on which no image is printed, are prepared and placed on the glass table 204 with their print surfaces facing down, as shown in FIG. 6. A user presses the copy button 302, the scanner carriage 201 operates, and the scanner unit 503 scans the copy source CD 601 and copy destination CD 602.

Figure 7A:
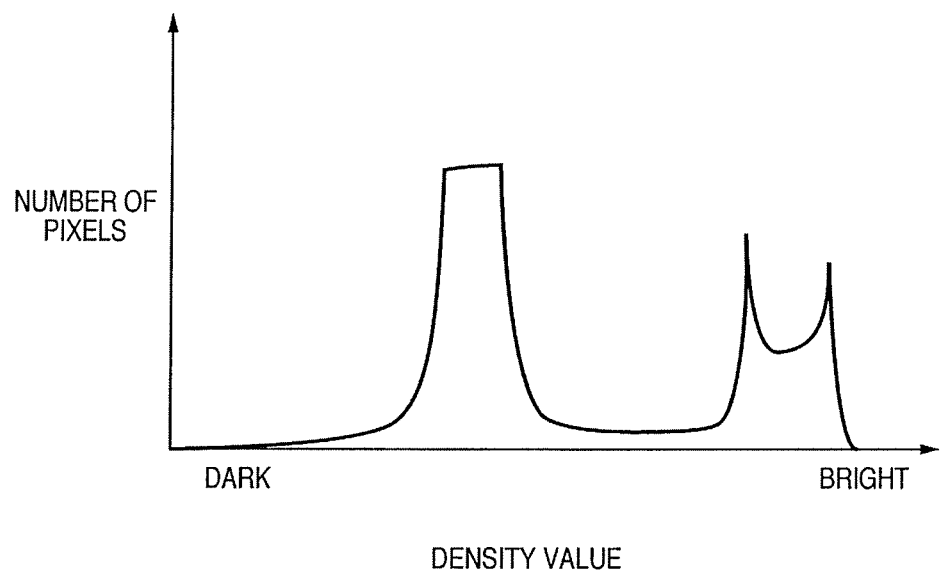
FIGS. 7A and 7B are histograms showing the relationship between the number of pixels and density values on the surfaces of a copy source CD and copy destination CD.
Figure 7B:
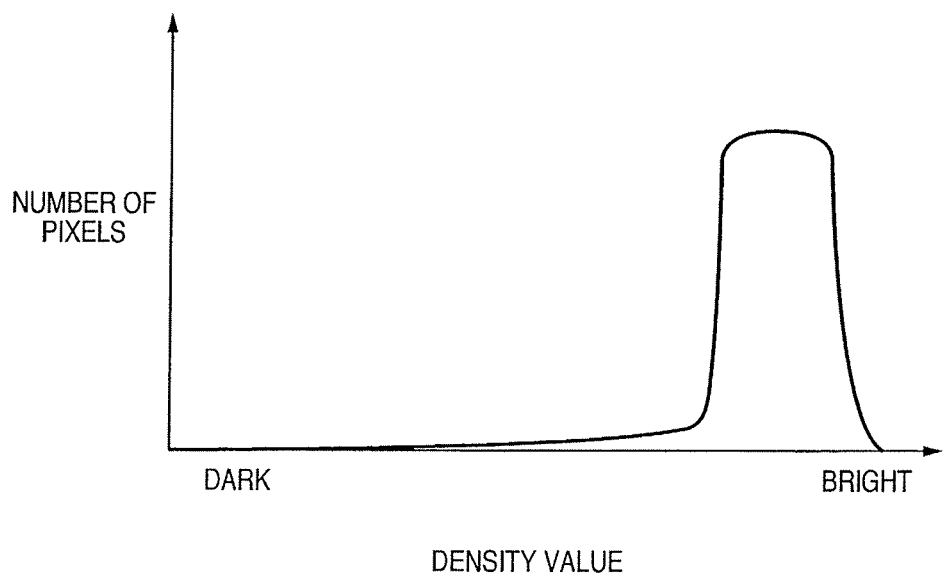

At this time, the density histograms of the copy source CD 601 and copy destination CD 602 are analyzed. FIGS. 7A and 7B are graphs showing the density histograms of the copy source CD 601 and copy destination CD 602, respectively.

As is apparent from FIG. 7A, an image is printed on the copy source CD 601, and there are various density pixels from low density (bright) to high density (dark). To the contrary, as is apparent from FIG. 7B, most of the label of the copy destination CD 602 is occupied by a single color for printing, and many pixels fall within a specific density region. In other words, there are many pixels of a density corresponding to a color used for the label in the copy destination CD 602. In this embodiment, the difference between the histograms of the copy source CD 601 and copy destination CD 602 is read to determine whether a scanned CD is a document (copy source) or a print medium (copy destination). In this case, a CD, on which the densities of pixels is spread, is determined to be the copy source CD 601.

As a result of scanning two CDs placed on the scanner section, the memory saves the image of a CD determined to be the copy source CD 601. For a CD determined to be the copy destination CD 602, the density distribution along a straight line passing through the center of the CD is analyzed.

Figure 8:
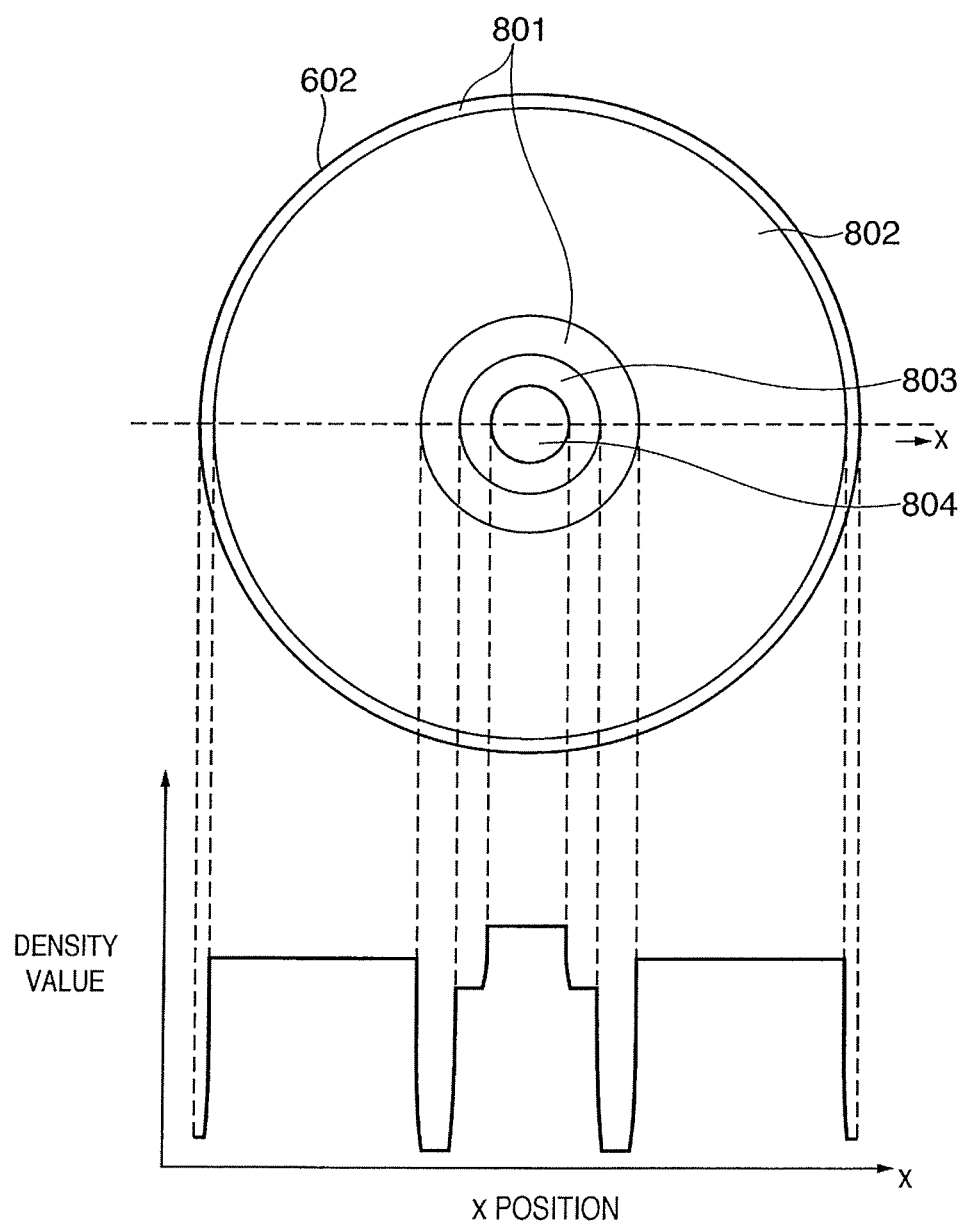
FIG. 8 is a view showing the density distribution along the center line of the copy destination CD.

FIG. 8 is a view showing the density distribution along the straight line passing through the center of the CD.

FIG. 8 shows the analysis result of the copy destination CD 602. As shown in FIG. 8, the surface of the copy destination CD 602 is formed from coating layers 801, a white printable area (label) 802 between the coating layers, and a transparent center portion 803.

When the scanner section scans the copy destination CD 602 along the straight line passing through its center, the surface density changes in correspondence with the above structure. That is, the density distribution changes, because the reflected light quantity changes between the protection (coating) layer 801, the printable area (label) 802, the center portion 803, and a CD hole 804, as shown in FIG. 8. In the embodiment, the CD edge is determined from the density distribution of the coating layer 801 and printable area (label) 802, the printable area (label) of the copy destination CD 602 is detected, and position information of the printable area is saved in the memory.

The image of the copy source CD 601 that has just been scanned by the scanner section is printed on the copy destination CD 602. For this purpose, the copy destination CD 602 is removed from the scanner section and is fitted into a disk medium printing tray (to be referred to as a special tray hereafter).

Figure 9:
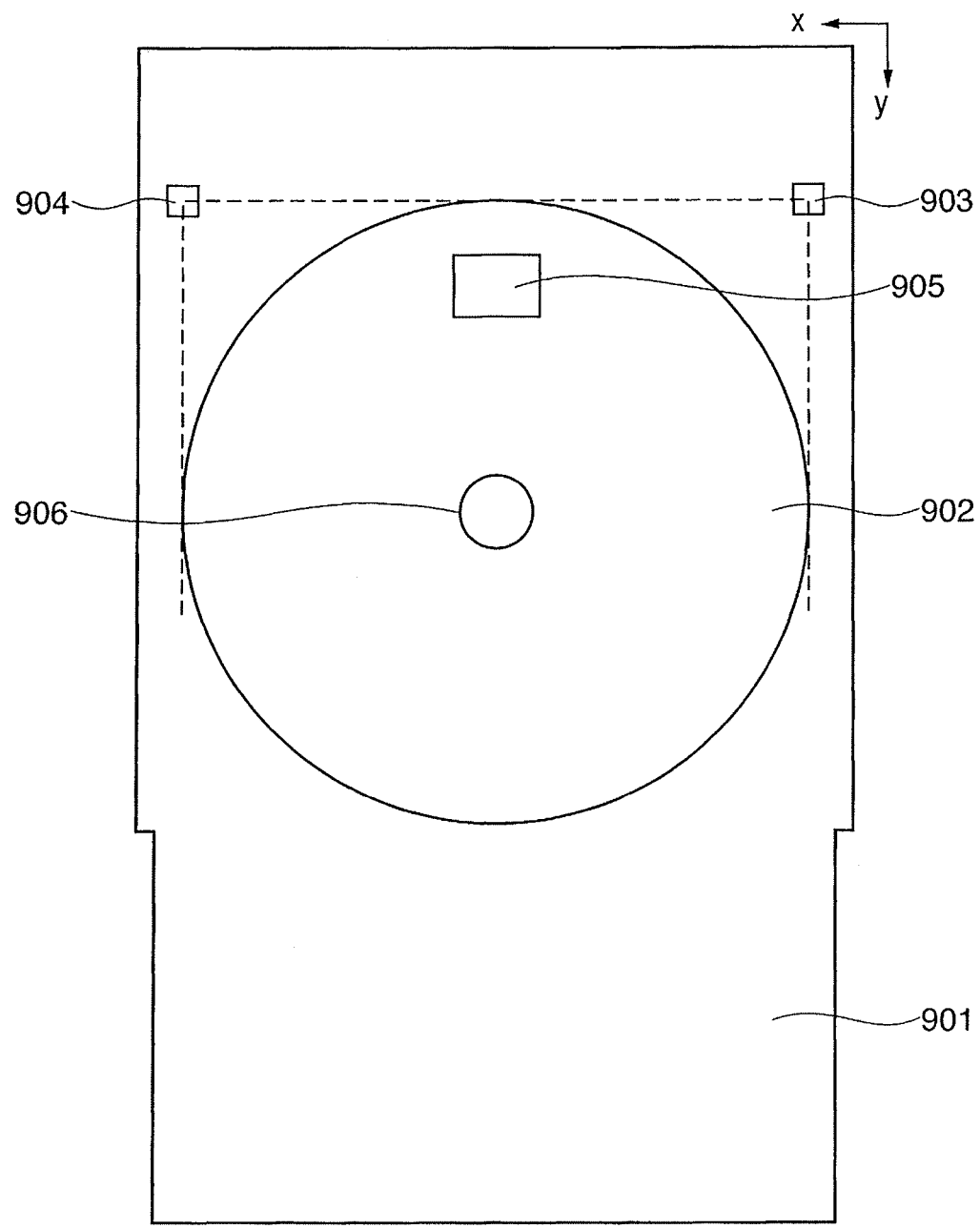
FIG. 9 is a plan view showing a special tray for printing on a disk medium.

FIG. 9 is a plan view showing the structure of the special tray.

More specifically, the copy destination CD 602 is fitted into a recess 902 of a special tray 901 shown in FIG. 9, with the label surface facing up. The special tray 901 is set at the discharge portion 107 of the MFP 101, and the conveyance mechanism of the printer section operates to load the special tray 901 into the MFP 101. The reflection optical sensor 411, attached to the carriage 401, reads three silver sheets 903, 904, and 905 on the special tray 901 to detect the position of the scanning CD.

As shown in FIG. 4, the reflection optical sensor 411 is attached to the right side of the carriage 401, and has a red LED and a phototransistor. The sensor uses the red LED to irradiate the print sheet 408 or CD 602, and uses the phototransistor to read the quantities of light reflected by the print sheet 408 or CD 602. By moving the carriage 401, the quantities of light reflected by the print sheet 408 or CD 602 can be continuously read in the direction indicated by the arrow B.

The sheet 903 is an 8 mm×8 mm silver square sheet used to determine the reference position of the special tray 901. The sheet 904 is an 8 mm×8 mm silver square sheet used to detect the shift amount of the special tray 901. The sheet 905 is a 12 mm×16 mm rectangular sheet used to determine whether the disk medium is 12 cm or 8 cm in diameter.

As is represented by broken lines in FIG. 9, the center position of the sheet 903 matches the right edge of the recess 902 in the x direction and its top edge in the y direction. The center position of the sheet 904 matches the left edge of the recess 902 in the x direction and its top edge in the y direction. By detecting these sheets, the conveyance shift of the special tray 901 can be detected. The sheet 905 is exposed when an 8 cm-diameter disk medium is placed on the special tray 901, but is hidden when a 12 cm-diameter disk medium is placed. This layout enables detecting an 8 cm-diameter disk medium and a 12 cm-diameter disk medium.

After reading these three sheets, the printer section discharges ink to the printable area (label) 802 of the copy destination CD 602 on the basis of the image data saved in the memory and position information of the printable area. After the end of the printing operation, the special tray 901 is unloaded to the discharge portion 107, completing the CD label copying operation.

The above-described disk medium label copying process will be explained with reference to a flowchart.

Figure 10A:
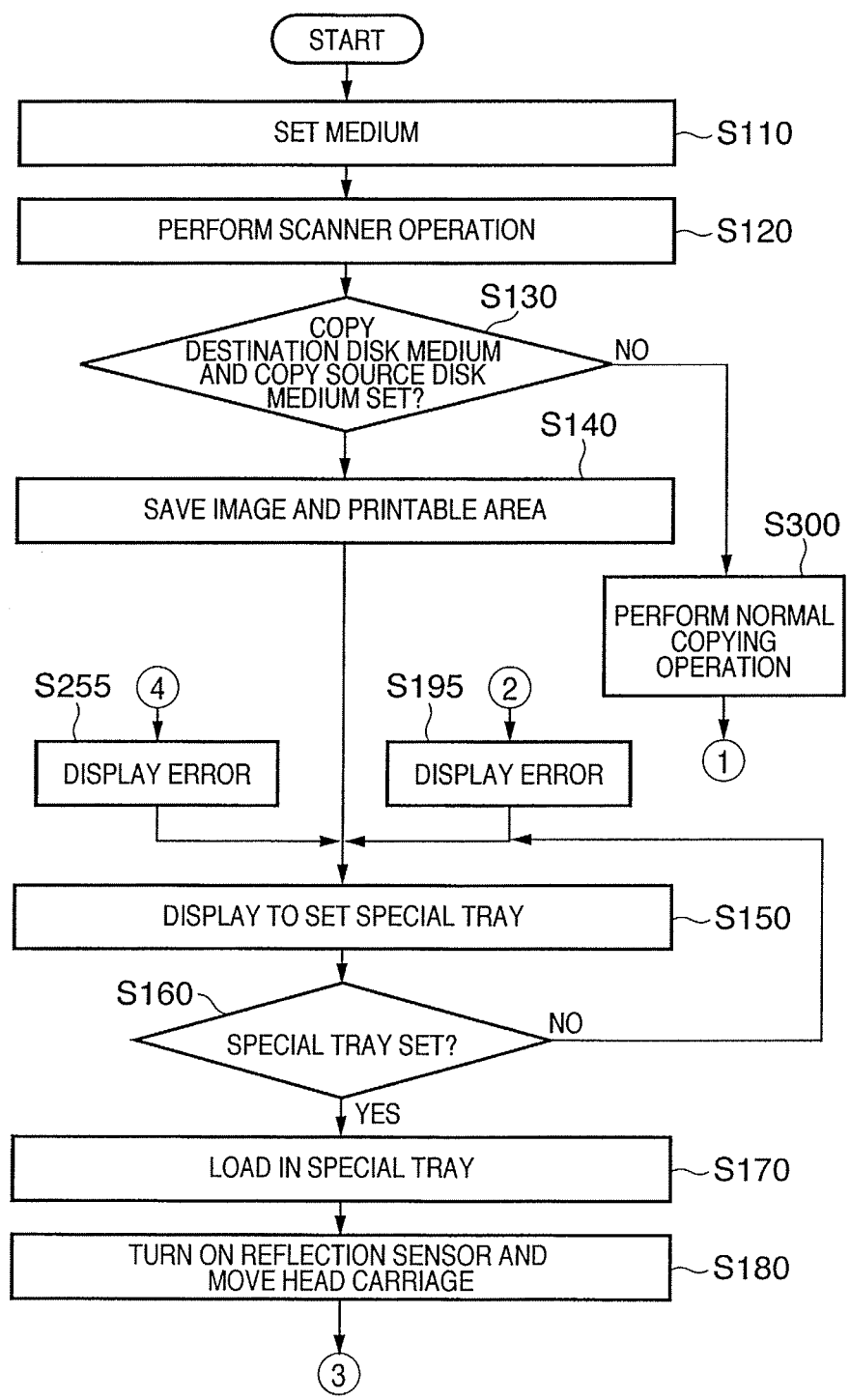
FIGS. 10A and 10B are flowcharts showing a CD label copying process.
Figure 10B:
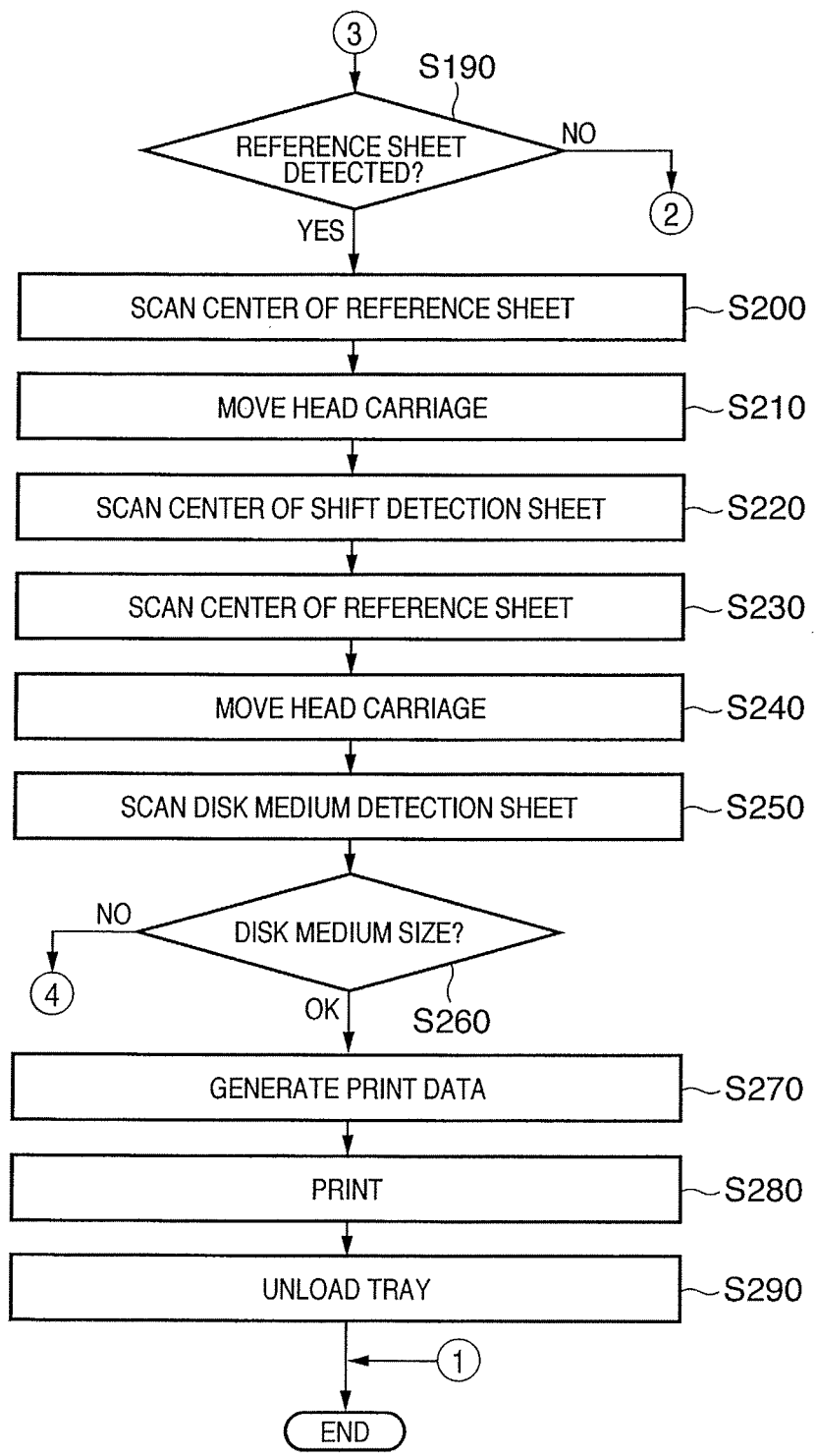

FIGS. 10A and 10B are flowcharts showing the disk medium label copying process. It is assumed that the positions of the carriage and reflection optical sensor are corrected in advance.

In step S110, a user sets a medium on the glass table 204. In step S120, the user selects copying of the disk medium label on the operation unit 104, and presses the copy button 302 to start a scanner operation.

After the scanner operation starts, it is confirmed whether or not a copy source CD (disk medium) and a copy destination CD (disk medium) are placed on the glass table. If it is determined that the media on the glass table are neither the copy source CD (disk medium) nor the copy destination CD (disk medium), the process advances to step S300 to perform a normal copying operation, and the process ends. If it is determined that the media on the glass table are the copy source CD (disk medium) and copy destination CD (disk medium), the process advances to step S140.

In step S140, the image of the copy source CD (disk medium) is scanned, position information of the printable area (label) of the copy destination CD (disk medium) is acquired in the above-described manner, and the memory stores the image and position information. In step S150, the color LCD 105 of the operation unit 104 displays a message: "Please set a disk medium to be printed on the special tray, and set the special tray in the discharge unit." In accordance with this message, the user sets, in the special tray 901, the copy destination CD (disk medium) placed on the glass table 204 in the discharge unit 107, and presses the OK button 306. In step S160, it is determined whether or not the special tray 901 is set. It is confirmed that the special tray 901 is set, and the process advances to step S170 to load the special tray 901 into the apparatus.

The process advances to step S180 to supply power to the reflection optical sensor 411, to drive the head carriage motor 505 and conveyance motor 506, and to detect the sheet 903 on the special tray 901. If the sheet 903 functioning as a reference sheet cannot be detected, it is determined that a medium different from the special tray 901 is inserted. The process advances to step S195 to display an error message and to prompt the user to confirm the tray. Then, the process returns to step S150 to prompt the user to set the special tray again. If the sheet 903 is detected, the process advances to the step S200.

In step S200, the head carriage motor 505 and conveyance motor 506 are driven to move the head carriage 401, and the reflection optical sensor 411 locates the center of the reference sheet. In step S210, the head carriage 401 moves in the x direction in FIG. 9. In step S220, the center of the sheet 904 is located. If the centers of the sheets 903 and 904 shift from each other, it is determined that the special tray 901 is loaded with a shift. Correction data is generated so as to print with the shift upon copying.

In step S240, the head carriage motor 505 and conveyance motor 506 are driven again to move the head carriage 410 and to position the reflection optical sensor 411 at a predicted position of the sheet 905. In step S250, the size of the copy destination CD (disk medium) is detected on the basis of whether or not the reflection optical sensor 411 detects the sheet 905. In step S260, the detected size of the copy destination CD (disk medium) is compared with the size of the copy source CD (disk medium), which has been scanned by the scanner section.

If it is determined that the two sizes are different from each other, it is determined that a medium different from the copy destination CD is set. The process advances to step S255 to display an error message. Thereafter, the process returns to step S150 to prompt the user again to set a correct medium on the special tray. If it is determined that the two sizes are equal to each other, the process advances to step S270, to generate print data containing enlargement/reduction data and correction data, so that the image data saved in the memory matches the printable area (label). In step S280, the print data is printed on the copy destination CD (disk medium). Finally, in step S290, the special tray 901 is unloaded, completing copying.

The above-described embodiment can achieve copying suitable for the printable area (label) of a disk medium by using the scanner section and printer section of the MFP, the special tray, and the carriage-mounted reflection optical sensor.

Another Embodiment

In disk medium label copying described in the embodiment above, a copy destination CD must be set twice on the glass table of the scanner section and the special tray. The following embodiment will describe an example of copying on a disk medium by setting the copy destination disk medium only once. This embodiment uses a DVD as a disk medium.

Figure 11:
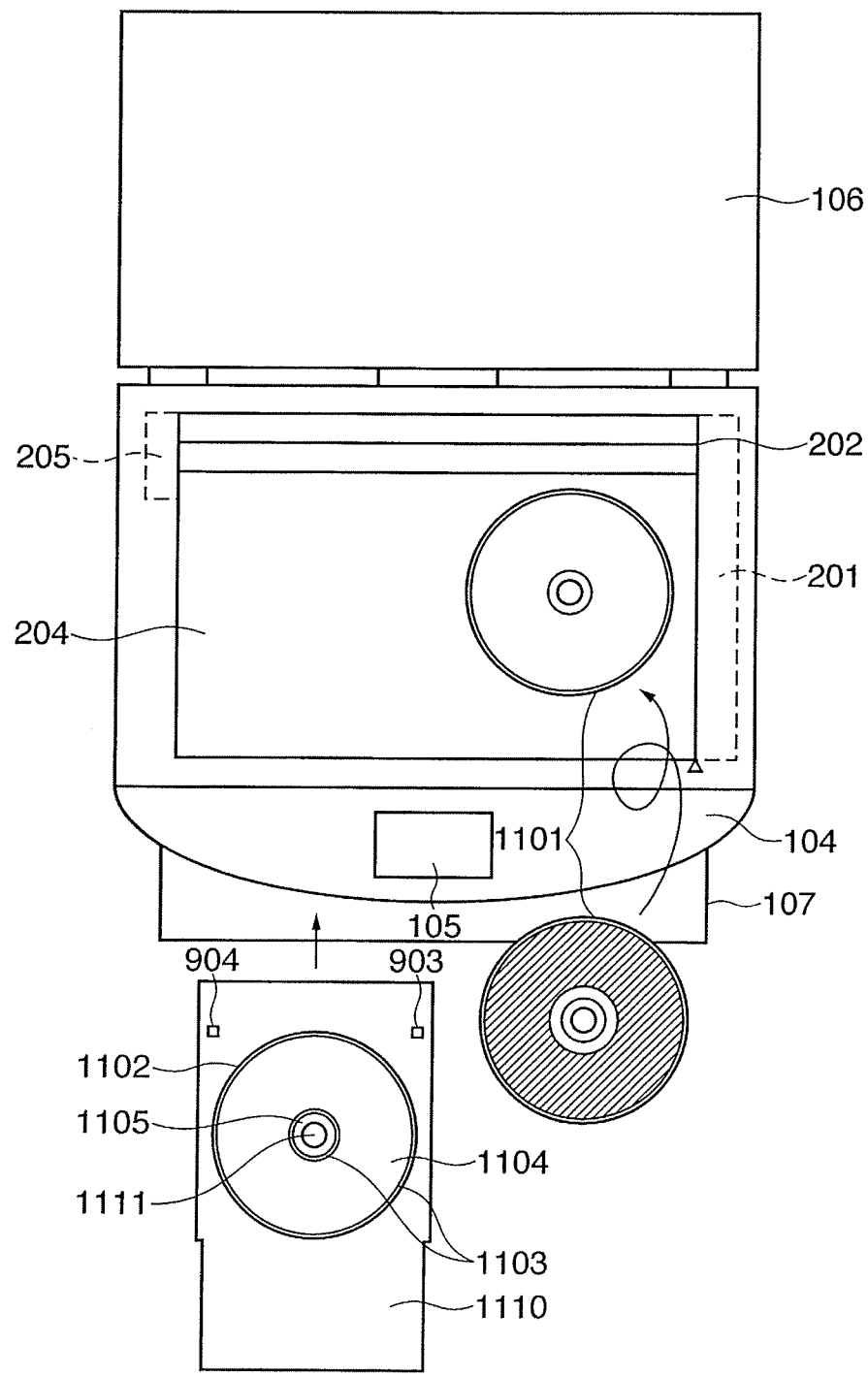
FIG. 11 is a view for explaining DVD label copying according to another embodiment.

FIG. 11 is a plan view of an MFP 101 showing a state in which a copy source DVD is placed on the glass table, while a copy destination DVD is fitted into the special tray.

As shown in FIG. 11, the structure of a special tray in this embodiment is the same as that used to copy on a CD in the embodiment above. The special tray 1110 has a white reference 1111 with an intermediate density between the densities of an ordinary DVD label and a glossy DVD label at the center of the tray.

As shown in FIG. 11, a copy source CD 1101, on which an image label has been printed, is placed on a glass table 204. A copy destination CD 1102 having a wide glossy printable area (label) 1104 is fitted into the special tray 1110. The surface of the copy destination DVD 1102 consists of a protection (coating) layer 1103 and a center portion 1105, in addition to the printable area (label) 1104.

A DVD label copying process according to the embodiment will be explained with reference to a flowchart.

Figure 12:
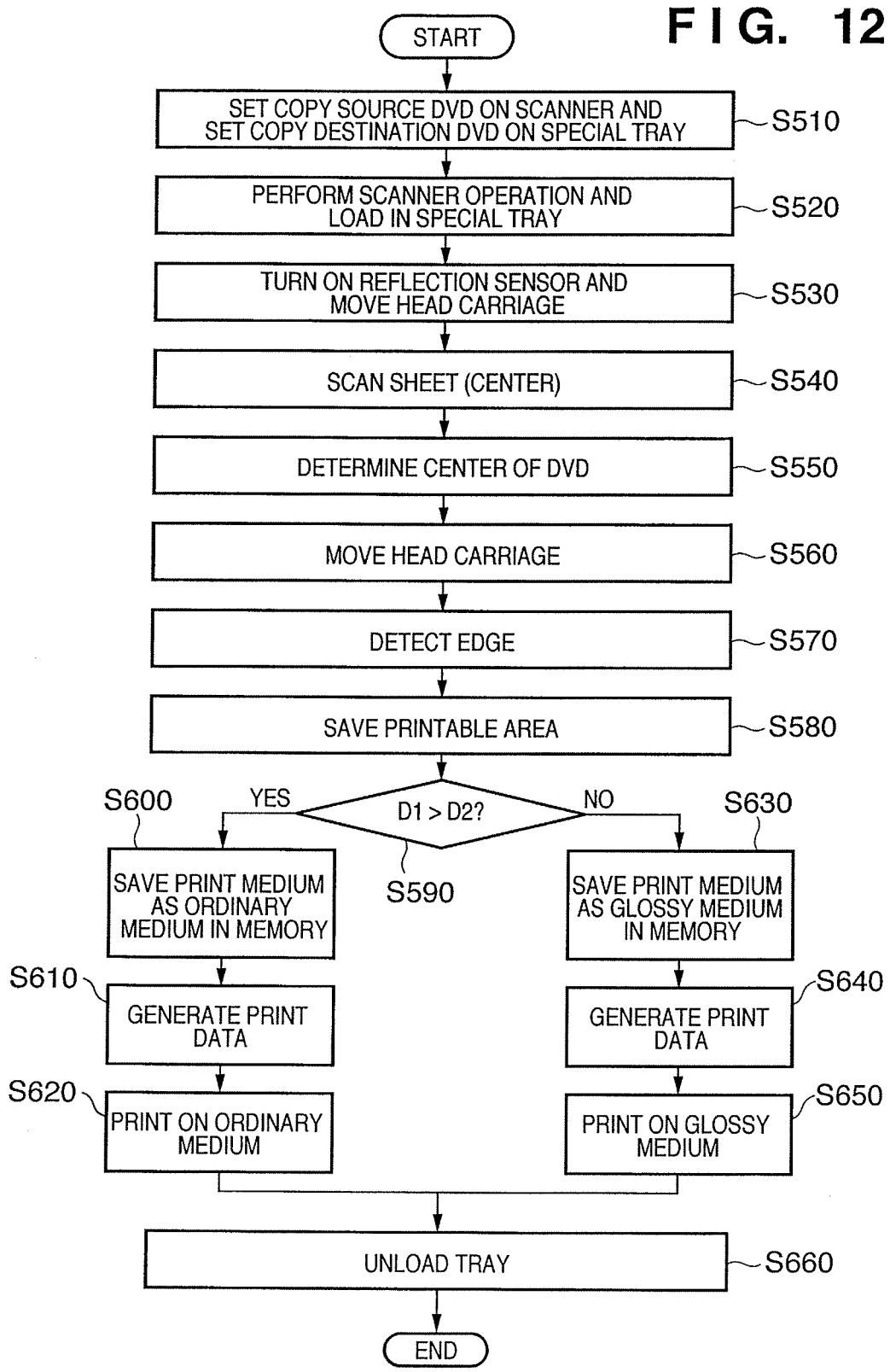
FIG. 12 is a flowchart showing a DVD label copying process according to the embodiment shown in FIG. 11.

FIG. 12 is a flowchart showing the disk medium label copying process. It is assumed that the positions of the head carriage and reflection optical sensor are corrected in advance.

In step S510, a user places the copy source DVD 1101 on the glass table 204 of the scanner section, while the user sets the copy destination DVD 1102 on the special tray 1110 and sets the special tray 1110 at a discharge portion 107. The user selects copying of the disk medium on an operation unit 104, and presses an OK button 306. In step S520, a scanner carriage 201 in the scanner section operates in accordance with the instruction, and scans the image of the copy source DVD 1101. At the same time, a conveyance motor 506 of the printer section is driven to load the special tray 1110 into the apparatus. The scanner section saves the image of the copy source DVD 1101 in the memory.

In step S530, the reflection optical sensor 411 is turned on in the printer section, and a head carriage motor 505 and the conveyance motor 506 are driven to move a head carriage 401, similar to the embodiment above. In step S540, sheets 903 to 905 are read to detect the reference position, the tray shift amount, and the size (type) of the copy destination DVD 1102.

In step S550, the central position value of the copy destination DVD 1102 is obtained from the center values of the sheet 903 and the detection sheet 904 on the basis of the detection result. In step S560, the head carriage motor 505 and the conveyance motor 506 are driven to move the head carriage 401 so as to position the reflection optical sensor 411 on the center line of the copy destination DVD 1102. In step S570, the reflection optical sensor 411 continuously scans the copy destination DVD 1102, including its center, in the lateral direction. The edge of the copy destination DVD 1102 is detected on the basis of the density distribution obtained by scanning.

Figure 13:
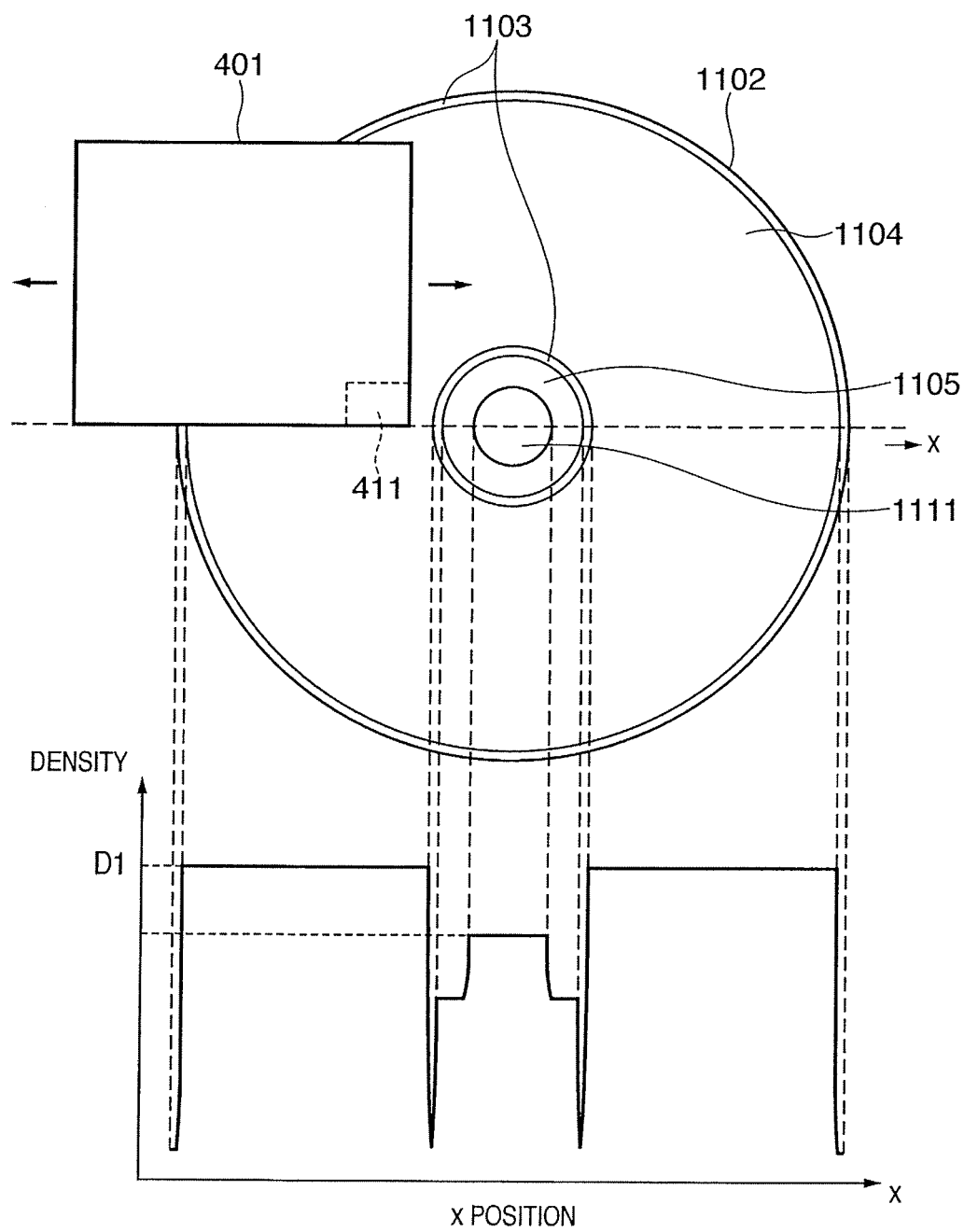
FIG. 13 is a view showing the density distribution along the center line of a DVD.

FIG. 13 is a view showing an example of the density distribution obtained by scanning along the center line of the copy destination DVD 1102.

FIG. 13 shows a state in which the reflection optical sensor 411 attached to the head carriage 401 scans the copy destination DVD 1102 in the x direction along the center line represented by a broken line. FIG. 13 also shows the density distribution obtained by scanning. The density distribution reveals that a relatively high, uniform density value is detected in the glossy printable area (label) 1104 and a uniform value corresponding to the density of the upper portion 1105 is detected at the center portion 1105. As described above, the white reference 1111 with an intermediate density between the densities of an ordinary DVD label and a glossy DVD label is arranged at the center of the tray. Thus, a density value corresponding to the white reference is obtained. The density value abruptly decreases at the two edges of the DVD, so the edge is detected from this change.

In step S580, information on the edge and printable area obtained from the density distribution is saved in the memory.

The process advances to step S590 to compare the density value D1 of the printable area (label) 1104 with the density value D2 of the white reference 1111 at the center of the tray. If D1<D2, it is determined that the copy destination DVD 1102 is an ordinary medium, and the process advances to step S600. In step S600, the type of medium information is saved in the memory. In step S610, print data is generated by enlarging (or reducing) image data, so that the print image saved in the memory matches the printable area. In step S620, printing is performed on the copy destination DVD 1102 on the basis of the generated print data.

If D1≧D2, as shown in FIG. 13, it is determined that the copy destination DVD 1102 is a glossy medium, and the process advances to step S630. In step S630, the memory saves the type of medium information. In steps S640 and S650, the same processes as those in steps S610 and S620 are performed to print on the copy destination DVD 1102. This embodiment detects a glossy medium from the glossiness type determination result of the copy destination DVD 1102. This embodiment performs printing control corresponding to the glossiness type, so as to prevent discharged ink from overflowing from the medium by increasing/decreasing the number of passes in multipass printing control, and the ink discharge amount.

After the process in step S620 or step S650, the special tray 1110 is unloaded in step S660, and the process ends.

This embodiment can achieve copying on a disk medium by setting in only once using the MFP 101 and special tray 1110. This embodiment is superior to the above-described embodiment, because the labor to set a disk medium can be saved, and the copy time can be shortened. Since the white reference 1111 is arranged at the center of the special tray 1110, the glossiness type of a printing disk medium can be identified to perform printing suited to its glossiness.

The above-described embodiments use ink to print on a disk medium, but the present invention can also use liquid, such as processed liquid or chemicals other than ink. The printhead of the printer section is not limited to a Bubble Jet® printhead, and may also be a piezoelectric printhead. The printer section adopts not only an inkjet printer, but also, a printer of another printing method, such as a thermal transfer method.

The above-described embodiments use an MFP configured by integrating the printer section and scanner section, but the present invention is not limited to this. For example, the present invention may employ an MFP integrated with a facsimile section having a transmission/reception function. The present invention may also be applied to a multifunctional system configured by connecting a printer, a scanner, and a host apparatus by wireless or wired communication means.

The method of detecting the label range and glossiness of a disk medium in the above-described embodiments is not limited to label copying between the disk media, but is also applicable to normal label printing on a disk medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A print control method performed by a print control apparatus, the method comprising:
   causing a reading apparatus to read surfaces of two disk media that are concurrently set on the reading apparatus;
   acquiring two images indicating respective surfaces of the two disk media obtained by the reading of the two disk media by the reading apparatus;
   specifying, from the acquired two images, a first image corresponding to a copy source disk medium of the two disk media and a second image corresponding to a copy destination disk medium of the two disk media, based on characteristics of the acquired two images;
   determining a printable area for printing an image on the copy destination disk medium based on the specified second image;
   generating print data based on the specified first image in accordance with the determined printable area on the copy destination disk medium; and
   causing a printing apparatus to print an image corresponding to the copy source disk medium on the determined printable area on the copy destination disk medium, based on the generated print data.

2. A non-transitory computer-readable storage medium storing a program for causing a computer to execute a print control method according to claim 1.

3. A print control apparatus comprising:

a control unit configured to control a reading apparatus to read surfaces of two disk media that are concurrently set on the reading apparatus;

an acquisition unit configured to acquire two images indicating respective surfaces of the two disk media, wherein the two images are obtained by the reading of the two disk media by the reading apparatus;

a specifying unit configured to specify, from the two images acquired by the acquisition unit, a first image corresponding to a copy source disk medium of the two disk media and a second image corresponding to a copy destination disk medium of the two disk media, based on characteristics of the two images acquired by the acquisition unit;

a first determination unit configured to determine a printable area for printing an image on the copy destination disk medium based on the second image specified by the specifying unit; and a print control unit configured to generate print data based on the first image specified by the specifying unit in accordance with the printable area on the copy destination disk medium determined by the first determination unit, and to cause a printing apparatus to print an image corresponding to the copy source disk medium on the printable area on the copy destination disk medium, based on the generated print data.

4. The apparatus according to claim 3, further comprising a second determination unit configured to determine a type of a label surface of the copy destination disk medium based on the second image of the printable area on the copy destination disk medium determined by the first determination unit, wherein the print control unit causes the printing apparatus to print in accordance with the type of the label surface of the copy destination disk medium determined by the second determination unit.

5. The apparatus according to claim 3, wherein the printing apparatus includes:

a carriage to which a printhead is mounted and which scans relative to the disk medium; and an optical sensor mounted to the carriage, wherein the acquisition unit acquires the second image obtained by optically reading the copy destination disk medium, using the optical sensor.

6. The apparatus according to claim 3, wherein the first determination unit determines the printable area on the copy destination disk medium based on a density distribution of the second image.

7. The apparatus according to claim 3, wherein the specifying unit specifies the first image and the second image from the two images, based on two density histograms respectively corresponding to the two images.

* * * * *